United States Patent [19]
Chin-San

[11] Patent Number: 5,858,889
[45] Date of Patent: Jan. 12, 1999

[54] ENVIRONMENT-FRIENDLY ACTIVE CLOTH AND ITS MANUFACTURING METHOD

[76] Inventor: Hsieh Chin-San, 3F, No. 14, Alley19, Lane76, Hao-Tong Road, Kaohsiung, Taiwan

[21] Appl. No.: 922,807

[22] Filed: Sep. 3, 1997

[51] Int. Cl.[6] ................................ B32B 5/24; B32B 5/22
[52] U.S. Cl. .................. 442/286; 442/288; 15/104.93; 15/208; 156/77
[58] Field of Search ...................... 442/286, 288, 442/294; 15/104.93, 208, 209.1, 210.1; 156/77

[56] References Cited

U.S. PATENT DOCUMENTS

| | | | |
|---|---|---|---|
| 2,408,682 | 10/1946 | Porter | 442/288 |
| 4,732,805 | 3/1988 | Maggs | 442/76 |
| 5,223,329 | 6/1993 | Amann | 15/104.93 X |
| 5,510,175 | 4/1996 | Shiozawa | 442/77 |

*Primary Examiner*—Daniel Zirker
*Attorney, Agent, or Firm*—Dougherty & Troxell

[57] ABSTRACT

An environment-friendly active cloth includes a fiber layer and a active cloth layer, and its manufacturing method. The active-cloth has a rough, properly soft and irregular surface, made of a first catalyst, a second catalyst, paste plant starch, liquid non-grain PVA, and a foam agent of proper weight mixed together. The active cloth layer has many percolating air holes, forming a single unit.

16 Claims, 5 Drawing Sheets

| MATERIAL | WEIGHT PERCENTAGE | REMARK |
|---|---|---|
| PVA | 47 - 65 % | POLYVINAL ALCOHOL |
| VEGETABLE STARCH | 28 - 47 % | SWEET POTATO POWDER WITH WATER |
| CATALYZER I | 4.5 - 10.0 % | HYDROCHLORIC ACID OF 32% CONCENTRATION |
| CATALYZER II | 3.6 - 10.0 % | FORMALIN OF 37% CONCENTRATION |
| FIBER | | THICKNESS BY NECESSITY |
| FOAMING AGENT | 0.015 - 0.06% | BY CHOICE |

FIG.2

| MATERIAL | WEIGHT PERCENTAGE | REMARK |
|---|---|---|
| PVA | 47 - 65 % | POLYVINYL ALCOHOL |
| VEGETABLE STARCH | 28 - 47 % | SWEET POTATO POWDER WITH WATER |
| CATALYZER I | 4.5 - 10.0 % | HYDROCHLORIC ACID OF 32% CONCENTRATION |
| CATALYZER II | 3.6 - 10.0 % | FORMALIN OF 37% CONCENTRATION |
| ACTIVE CARBON | 0.3 - 180 % | BY NECESSITY |
| FIBER | | THICKNESS BY NECESSITY |
| FOAMING AGENT | 0.015 - 0.06 % | BY CHOICE |

FIG.5

ENVIRONMENT-FRIENDLY ACTIVE CLOTH AND ITS MANUFACTURING METHOD

BACKGROUND OF THE INVENTION

This invention concerns an environment-friendly active cloth and its manufacturing method, particularly having strong dirt removing force, good structure, proper softness, and being easy to wash and quick to dry.

Generally common rubbing or cleansing cloths have to use detergent at the same time for cleaning tables, tableware, glass, mirrors, etc. to permit their surfaces to be bright and shining.

However, a conventional rubbing cloth or cleansing cloth generally has rather weak dirt removing force, needing to use detergent at the same time. Sometimes a bit of cotton or string from the rubbing cloth may remain on things washed. In addition, they do not last long, having to be replaced with a new one, owing to its structure. Moreover, in washing, the rubbing cloth may be clogged with dirt, which is hard to remove, and become black and untidy, and taking some time to dry. Besides, its water absorbing feature is not good and water may remain on things washed by it, which then have to be wiped with a dry cloth again, which makes it inconvenient to use, In addition, conventional rubbing cloths have wide ranges of softness, some are so soft like a sponge and easily broken, and some very coarse and hard to damage things being washed, limiting its scope of usage.

SUMMARY OF THE INVENTION

The purpose of the invention is to offer an environment-friendly active cloth that is easy to wash, quick to dry, and has strong dirt removing force, good structure, and proper softness, and its manufacturing method.

A feature of the active cloth is a fiber layer tightly combined with an active cloth layer, the active cloth layer having a rough, properly soft and irregular surface and many percolating air holes in its body.

The manufacturing method includes steps of preparing materials, of coating a mixed solution on a fiber layer, of a reaction step of a foaming process of the active cloth layer with the fiber layer, of temperature lowering and cooling, of washing and compressing the active cloth layer with the fiber layer, and of drying.

BRIEF DESCRIPTION OF DRAWINGS

This invention will be better understood by referring to the accompanying drawings, wherein:

FIG. 2 is a table of ingredients of the environment-friendly active cloth of the present invention;

FIG. 5 is a table of ingredients of a third preferred embodiment of the environment-friendly active cloth in the present invention.

DETAILED DESCRIPTION OF THE PREFERRED EMBODIMENTS

Figure 1:
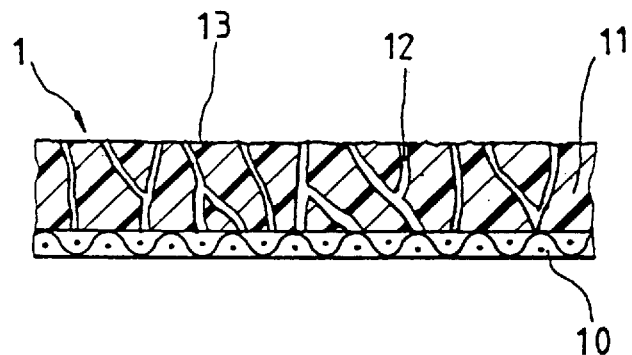
FIG. 1 is a cross-sectional view of a first preferred embodiment of an environment-friendly active cloth of the present invention.

A first preferred embodiment of environment-friendly active cloth 1 in the present invention, as shown in FIG. 1, includes at least a fiber layer 10 and an active cloth layer 11 under the layer of fiber layer 10. The active cloth layer 11 has a rough, properly soft and irregular surface 13, as a smooth surface cannot function to remove dirt very effectively. The active cloth layer 11 is made of a first catalyst, paste plant starch, liquid non-grain PVA (polyvinyl alcohol), and a foam agent of a proper weight, if wanted, as can be found in ingredient table shown in FIG. 2, and formed with many percolating air holes 12.

Figure 3:
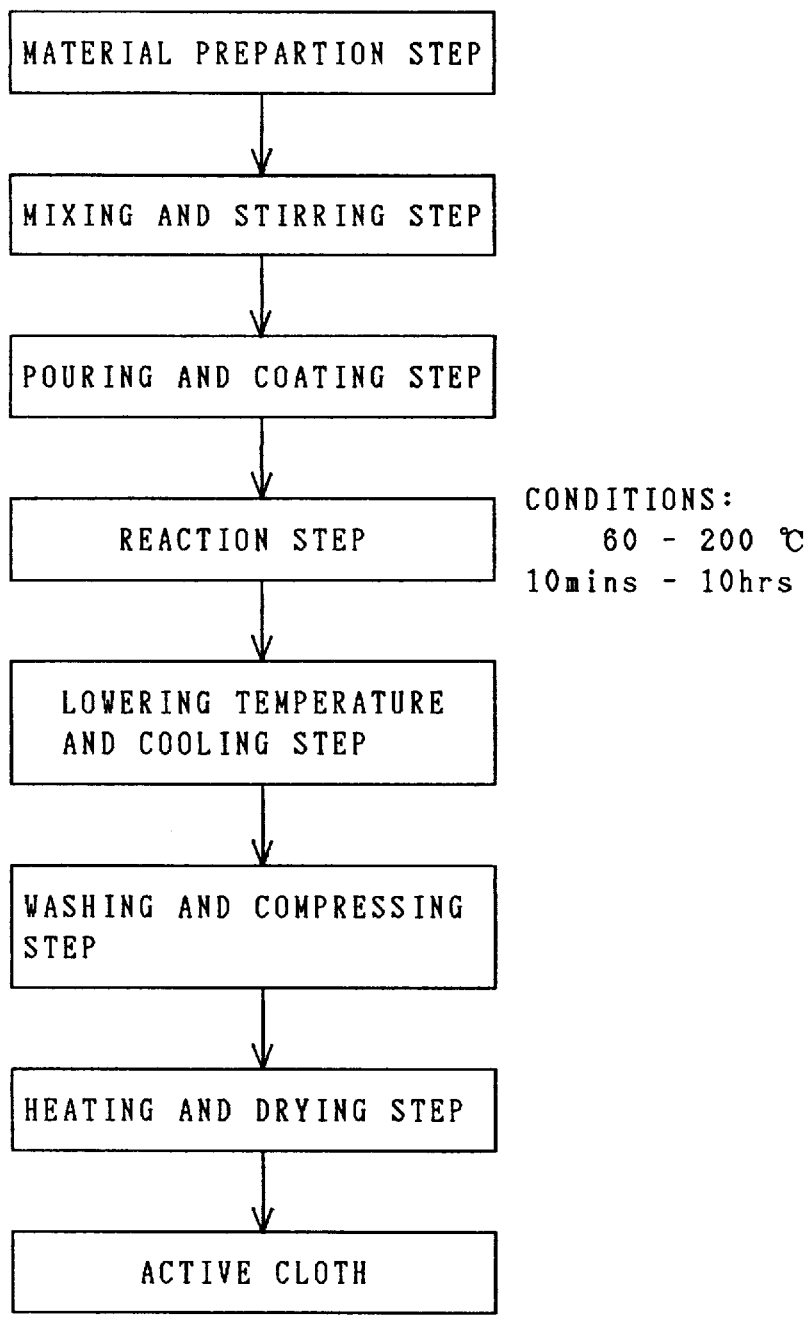
FIG. 3 is a block diagram of a manufacturing method of the environtment-friendly active cloth of the present invention.

FIGS. 2 and 3 show the ingredients of the active cloth layer 11 and a block diagram of its manufacturing method.

As shown in FIG. 2, the active cloth layer 11 contains paste plant starch of 28%–47% wt., liquid non-grain PVA of 47%–65% wt., a first catalyst such as formalin of 37% concentration 3.6%–10.0% wt., a second catalyst such as hydrochloric acid of 32% concentration of 4.5%–10.0% wt., or additionally a foam agent of 0.015%–0.06% of the aggregate weight of the all above materials. Firstly, these materials have to be prepared as a first step of its manufacturing.

A second step of manufacturing after the first step of material preparation is mixing and stirring these materials sufficiently together.

Then a third step is to pour and coat the mixed material solution evenly on the fiber layer 10, which may have different thickness according to necessity so as to get structural feature in the invention.

A fourth step of manufacturing is to proceed with reactive foaming, wherein the active cloth layer 11 with the fiber layer 10 is put in a reaction oven having an inner temperature of 60°–200° C., for 10 min—10 hrs. The temperature of the furnace, time and speed needed in reaction can be moderated as requirements demand. The purpose of the reaction step is to let the paste plant starch and the liquid non-grain PVA link with each other sufficiently by means of temperature and time and possible to exhaust water, forming the environment-friendly active cloth shown in FIG. 1. The exhausted water is temporarily stored in the percolating air holes 12 and then is completely removed in a step coming later.

A fifth step is to lower the temperature and cool it to a room temperature.

A sixth step is to wash and compress the environment-friendly active cloth 1 for removing water remaining in the percolating air holes 12 and the catalyst so as to make the cloth 1 of neutral quality.

The environment-friendly active cloth 1 has high water absorbing characteristics for storing water therein, because of its many air holes and its water absorbing features of the materials themselves. The characteristics of the strong dirt removing force comes from the strong attaching force and catching force of the material itself against objects being rubbed, and by the irregular rough and properly soft surface 13 having dirt attaching force and catching force. The attached dirt on the cloth 1 may be removed by washing and squeezing to dry.

Then a final seventh step is to dry by heating the cloth 1 to finish manufacturing the environment-friendly active cloth 1.

Figure 4:
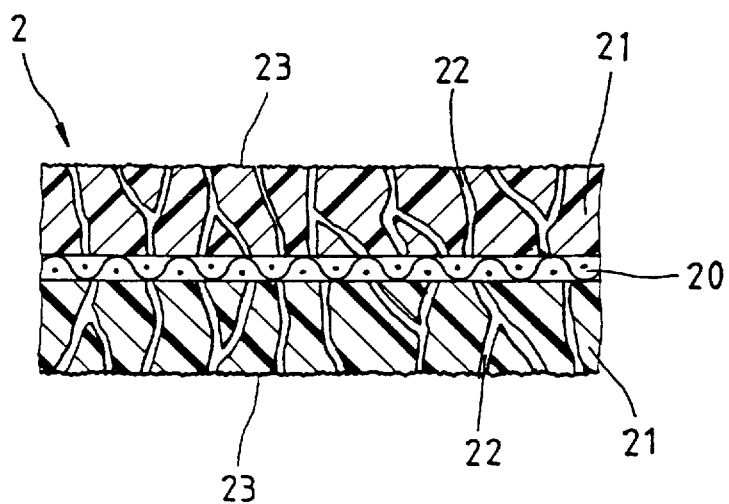
FIG. 4 is a cross-sectional view of a second preferred embodiment of the environment-friendly active cloth of the present invention.

FIG. 4 shows a second preferred embodiment of an environment-friendly active cloth 2, which has a fiber layer 20 and two active cloth layers 21 on two surfaces of the fiber layer 20. Each active cloth layer 21 has a rough, properly soft and irregular surface 23, and many percolating holes 22 formed in its body to become a complex unit instead of a single unit in the first embodiment. Thus, the cloth 2 may further reinforce its power for dirt removing, enhance its structure of proper softness and quick drying to be more practical.

Figure 6:
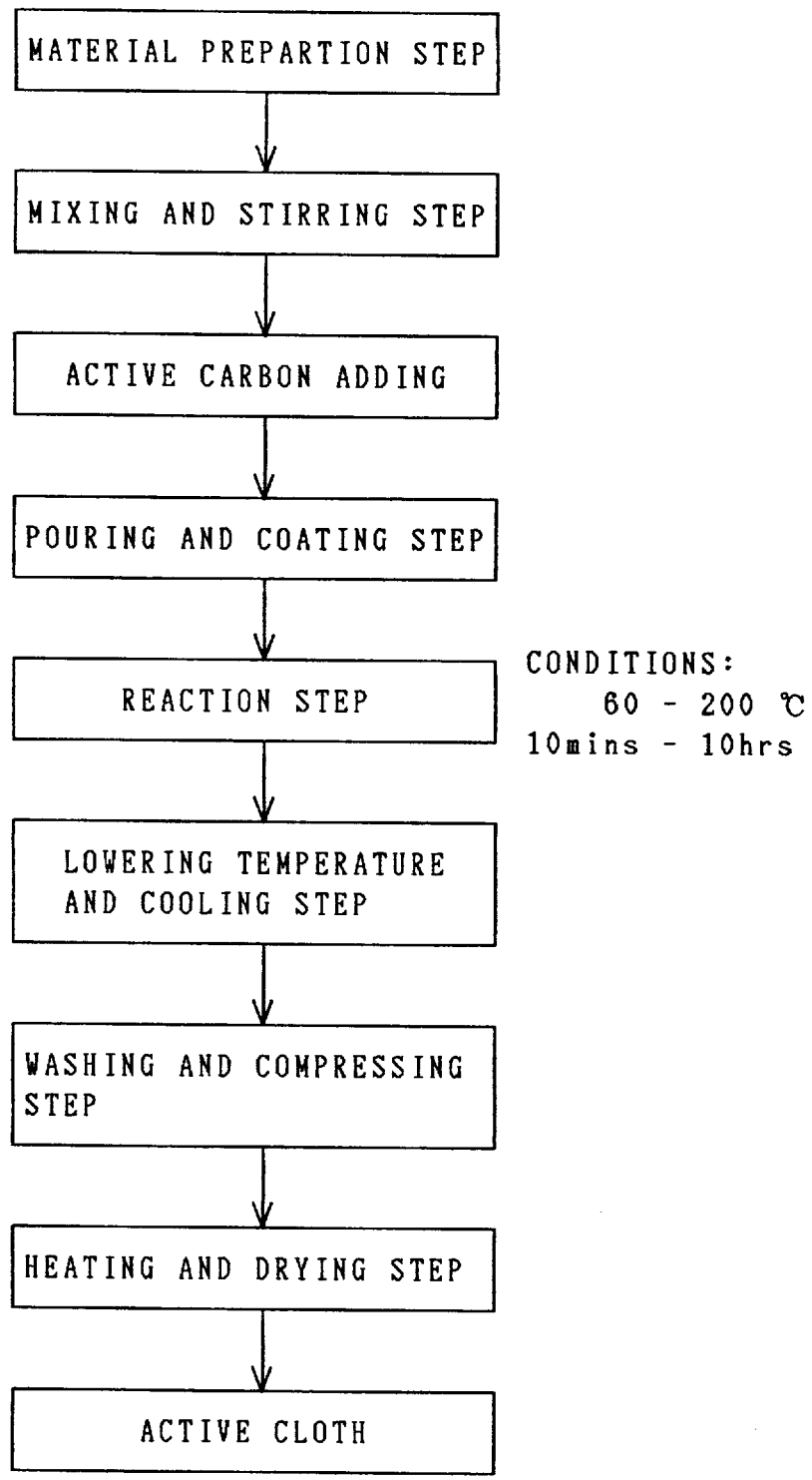
FIG. 6 is a block diagram of the third preferred embodiment of the environment-friendly active cloth of the present invention.

A third preferred embodiment of an environment-friendly active cloth is shown in FIGS. 5 and 6, including an additional active carbon of 0.3–180% wt. of the aggregate weight of the all above mentioned materials, and fiber (preferably sheet shaped), for forming an environment-friendly active cloth having toxic-filtering and odor-removing functions. Weight percentage of active carbon is decided by necessity, and the higher its weight percentage is, the feebler the cloth becomes.

The material solution gotten by the mixing and stirring step is saturated, and it is important that active carbon is added in the saturated solution in the last stage. As active carbon has strong attaching characteristics and function, it never fails to attach with the paste starch and becomes wrapped inside if it is added in an early stage of the mixing step. Should this wrong treatment happen, active carbon could not function to filter toxic and remove odor since it would be completely wrapped and not able to contact open air after dehydration. This step of mixing active carbon in the present invention is an essential point, improving the conventional technique of coating it only on surfaces of objects or wrapping it up in the starch.

As can be understood from the aforesaid description, this invention has the following advantages.

1. It has a strong dirt removing force, not needing detergent, decomposing naturally in the ground after being discarded, and completely meeting environment protecting demands.
2. It cannot leave bits from its body on objects being rubbed and wiped, attaining the effect of cleanness and beautiful appearance after rubbing and wiping.
3. It can remove dirt in small holes, and dirt and oily matters hidden in wrinkles of small holes of leather.
4. It cannot easily or naturally tear, slit or decay, therefore it lasts long, making it unnecessary to be frequently replaced.
5. It provides a strong dirt removing force, because the materials themselves have strong attaching force and catching forces, cooperating with the rough, properly soft and irregular surface of the cloth having dirt attaching force and catching force.
6. In washing and cleansing, it can easily remove dirt attached to objects being washed, and be squeezed dry to always keep the whole active cloth fine and neat.
7. It has excellent water absorbing properties to wipe off water, never leaving a bit of water, thus avoiding the need to wipe with a dry cloth, and being convenient to use.
8. It can be used in a wide scope, even functioning as a towel, bathing cloth, cosmetic removing cotton, etc.
9. If active carbon and fiber of proper volume are added, it can filter toxic and remove odor, as an environment-friendly cloth.

While the preferred embodiments of the invention have been described above, it will be recognized and understood that various modifications may be made therein and the appended claims are intended to cover all such modifications which may fall within the spirit and scope of the invention.

What is claimed is:

1. An environment-friendly active cloth comprising: a fiber layer; and at least one active cloth attached to said fiber layer, said at least one active cloth layer having a rough, soft and irregular surface and made of a first catalyst, a second catalyst, paste plant starch, ad liquid non-grain polyvinyl alcohol (PVA), so as to form a single unit containing microporous air holes in said active cloth layer.

2. The environment-friendly active cloth as claimed in claim 1, further comprising two active cloth layers, one on each of two oppositely facing surfaces of said fiber layer each of said active cloth layers having a rough, soft and irregular surface and with microporous air holes formed in its body.

3. The environment-friendly active cloth as claimed in claim 1, wherein said at least one active cloth is made of paste plant starch of 28%–47% wt., liquid non-grain PVA of 47%–65% wt., a first catalyst of 3.6%–10.0% wt., and a second catalyst of 4.5%–10.0% wt. mixed together.

4. The environment-friendly active cloth as claimed in claim 3, wherein said at least one active cloth further contains a foam agent of 0.015%–0.06% wt. of the aggregate weight.

5. The environment-friendly active cloth as claimed in claim 3 wherein the first catalyst comprises formalin.

6. The environment-friendly active cloth as claimed in claim 5 wherein the second catalyst comprises hydrochloric acid.

7. The environment-friendly active cloth as claimed in claim 6 wherein the formalin has a concentration of 37%.

8. The environment-friendly active cloth as claimed in claim 7 wherein the hydrochloric acid has a concentration of 32%.

9. The environment-friendly active cloth as claimed in claim 1, wherein said at least one active cloth further contains active carbon and fiber to provide a function of toxic filtering and removing odor.

10. A method for manufacturing an environment-friendly active cloth comprising the steps of: mixing materials consisting of paste plant starch of 28%–47% wt., liquid non-grain PVA of 47%–65% wt., a first catalyst of 3.6%–10.0% wt., a second catalyst of 4.5%–10.0% wt., a foam agent of 0.015%–0.06% wt. of the aggregate weight, and stirring all of said materials into a solution; coating said mixed solution evenly on a fiber layer to form an active cloth layer on said fiber layer; reacting said active cloth layer with said fiber layer by foaming; lowering the temperature and cooling said active cloth layer with said fiber layer, washing and compressing said active cloth layer with said fiber layer; and drying said active cloth layer with said fiber layer to obtain said environment-friendly active cloth.

11. The method for manufacturing an environment-friendly active cloth as claimed in claim 10, wherein said reacting step is performed in a reactive furnace having inner temperature of 60° C.–200° C., with a reaction time between 10 min.—10 hrs. for linking said paste plant starch with said liquid non-grain PVA and for exhausting water to form said environment-friendly active cloth with microporous air holes.

12. The method for manufacturing an environment-friendly active cloth as claimed in claim 10, wherein said mixing step further comprises mixing active carbon of 0.3%–180% wt. of the aggregate weight of said materials and fiber, for forming an environment-friendly active cloth having toxic filtering and odor removing functions.

13. The method for manufacturing an environment-friendly active cloth as claimed in claim 10 wherein the first catalyst comprises formalin.

14. The method for manufacturing an environment-friendly active cloth as claimed in claim 13 wherein the second catalyst comprises hydrochloric acid.

15. The method for manufacturing an environment-friendly active cloth as claimed in claim 14 wherein the formalin has a concentration of 37%.

16. The method for manufacturing an environment-friendly active cloth as claimed in claim 15 wherein the hydrochloric acid has a concentration of 32%.

* * * * *